United States Patent [19]

Suzuki et al.

[11] 4,176,403
[45] Nov. 27, 1979

[54] PROGRAMMABLE SEQUENCE CONTROLLER

[75] Inventors: Isao Suzuki, Okazaki; Toshihiko Yomogida, Kariya; Tsuyoshi Yokota, Okazaki, all of Japan

[73] Assignee: Toyoda-Koki Kabushiki-Kaisha, Aichi, Japan

[21] Appl. No.: 917,257

[22] Filed: Jun. 20, 1978

[30] Foreign Application Priority Data

Jun. 23, 1977 [JP] Japan .................................. 52-74881

[51] Int. Cl.$^2$ ........................... G06F 7/00; G06F 7/02
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,701,113 | 10/1972 | Chace et al. | 364/200 |
| 3,810,104 | 5/1974 | Markley | 364/200 |
| 4,011,544 | 3/1977 | Cherrey | 364/900 |

Primary Examiner—Harvey E. Springborn

Attorney, Agent, or Firm—Oblon, Fisher, Spivak, McClelland & Maier

[57] ABSTRACT

A programmable sequence controller wherein in accordance with a sequence program read out from a memory, a logic operation circuit tests a logical value supplied from an input converter connected to an external input element and generates an output command signal based upon the result of the test. The output command signal is stored in an output memory which has two storage addresses for each external output element, each storage address corresponding to a particular memory storage element addressed by the sequence program. A gate circuit is connected to these two memory storage elements and inhibits the application of an output command signal from one of the memory storage elements to an output converter when the gate circuit receives a logical value from the input converter. When receiving an output command signal from the other of the two memory storage elements the gate circuit then applies this signal to the output converter. Thus, an output element connected to the output converter is energized immediately in response to the operation of an input element.

5 Claims, 9 Drawing Figures

PROGRAMMABLE SEQUENCE CONTROLLER

BACKGROUND OF THE INVENTION

1. Field of the Invention

The present invention relates to a programmable sequence controller which, in accordance with a sequence program read out from a memory, tests operational states of external input elements such as limit switches so as to energize external output elements such as magnetic relays based upon the results of the tests.

2. Description of the Prior Art

Today, because of being versatile, highly reliable and miniature, sequence controllers of a stored program type have been used for control of machine tools. In such a type of the controllers, instructions of a stored program are successively read out, in accordance with which operational states of external input elements are tested so as to energize or deenergize designated external output elements based upon the result of such tests. While the whole of the stored instructions is read out one time, in other words, during one scan, the operational state of each input element is read only one time. Accordingly, even if the operational state of a certain input element were changed in the course of a scan, such change is not detected immediately, and a considerable time delay occurs until the detection of the state change. Moreover, this time delay varies at every scan cycle since the operational state of the input element changes completely independently of the progress of the scan cycle. The time delay reaches at most the time that is taken to execute one scan of the stored program. For example, in the case where a 4000-word sequence program is executed by a sequence controller which operates at a processing speed of 10 μs per word, the time delay ranges from 0 to 40 ms. The time delay of this range does not raise any inconvenience in executing a conventional sequence control, but raises some inconvenience in controlling the position of a spindle unit based upon a signal from a limit switch. For example, in positioning a spindle unit that is fed at a speed of 6 mm/min., the positioning error reaches at most 4 mm.

In order to solve the above noted defect, there has heretofore been suggested a programmable sequence controller whose output circuit 11, as shown in FIG. 1, is provided with an inhibition gate 12, which, upon receipt of a signal supplied from an external input element LS10 to a terminal 13, does not pass a program-issued energization command so as to directly deenergize an external output element M connected to an output converting circuit 14 based upon the signal. If such an output circuit 11 is applied to a controlled object which must be controlled immediately in response to a signal from a detector, such as the input element LS10, any inconvenience caused by response delay would be avoided. In the prior controller, however, since the operational state of the input element LS10 is not communicated to the operation control device 10, it is impossible to reset the latch circuit 15 in accordance with the sequence program after the input element LS10 is actuated. This not only causes the output element M to be subsequently energized in response to reopening of the input element LS10, but also brings about an noncoincidence between the operational state of the output element M and the content of the latch circuit 15. Accordingly, unless an external cable is used to inform the operation control device 10 of the operational state of the output element M, the sequence controller cannot perform correct sequence control. Additionally, since the restart of a slide member from a certain stop position is often necessary in an ordinary positioning control, there is encountered the need for reenergizing of the output element M by inhibiting passage of the signal from the input element LS10. In the prior controller, however, once the input element is closed, it is impossible to energize the output element in accordance with the sequence program, and such control cannot be carried out without the provision of an external auxiliary relay that inhibits the passage of the signal from the input element LS10.

SUMMARY OF THE INVENTION

Accordingly, it is a primary object of the present invention to provide an improved programmable sequence controller which is capable not only of inhibiting passage of an output command signal which energizes an external output element, in response to a signal from an external input element, but also of enabling passage of the output command signal in accordance with a stored sequence program.

Another object of the invention is to provide a sequence controller of the character set forth above wherein a gate circuit on an input/output hybrid card is responsive to two output command signals for energizing an external output element.

A further object of the invention is to provide a sequence controller of the character set forth above, which in addition to an input/output hybrid card connectable to both of external input and output elements, is also provided with an input card connectable only to external input elements and an output card connectable only to external output elements.

Briefly, according to the present invention, there is provided a programmable sequence controller comprising a program memory, which is controlled by a read-out control circuit for successively reading out control instructions each of which includes a test command or an output command and associated address data. The sequence controller includes a data selector which applies the operational state of an external input element from an input converter to a logic operation circuit when the input element is designated by the address data. The logic operation circuit is responsive to the test command so as to test the operational state of the designated input element and is also responsive to the output command so as to send an output command signal to an addressable output memory based upon the result of the test.

In the present invention, the output memory has at least two storage addresses for one external output element, each of which stores thereat the output command signal when designated by the address data accompanied by the output command. Furthermore, the sequence controller features the provision of a gate circuit, which is connected to the input converter and the two storage addresses, for invalidating the output command signal from one of the two storage addresses when receiving an output from the input converter and for removing the invalidation of the output command signal when subsequently receiving the output command signal from the other of the two storage addresses. An output converter connected to the gate circuit is therefore enabled to deenergize the output element, connectable thereto, immediately in response to the operation of the input element and to reenergize the output element subsequently in accordance with the commands of a sequence program read out from the program memory.

Accordingly, direct control of the output element based upon the state change of the input element is possible without adding to the sequence controller any external auxiliary control device such as an auxiliary relay and any external cable for interlocking control, and this advantageously results in extending the versatility of the sequence controller. Further, the one of the two storage addresses which are associated with the output element is controlled to have its memory state coinciding with the operational state of the output element without a considerable time delay so that the sequence controller can execute reliable control operation. Particularly, since the invalidation of the output command signal to the output element is removed in accordance with the sequence program, no external auxiliary control device such as an auxiliary relay is added to the sequence controller even in the case where the use of the controller is directed to a controlled object in which a spindle head must be readvanced from an intermediate stop position.

BRIEF DESCRIPTION OF THE DRAWINGS

Various other objects, features and attendant advantages of the present invention will readily be appreciated as the same becomes better understood from the following detailed description of a preferred embodiment when considered in connection with the accompanying drawings, wherein like reference numeral designate like or corresponding parts throughout the several views, and in which.

DETAILED DESCRIPTION OF A PREFERRED EMBODIMENT

Figure 2:
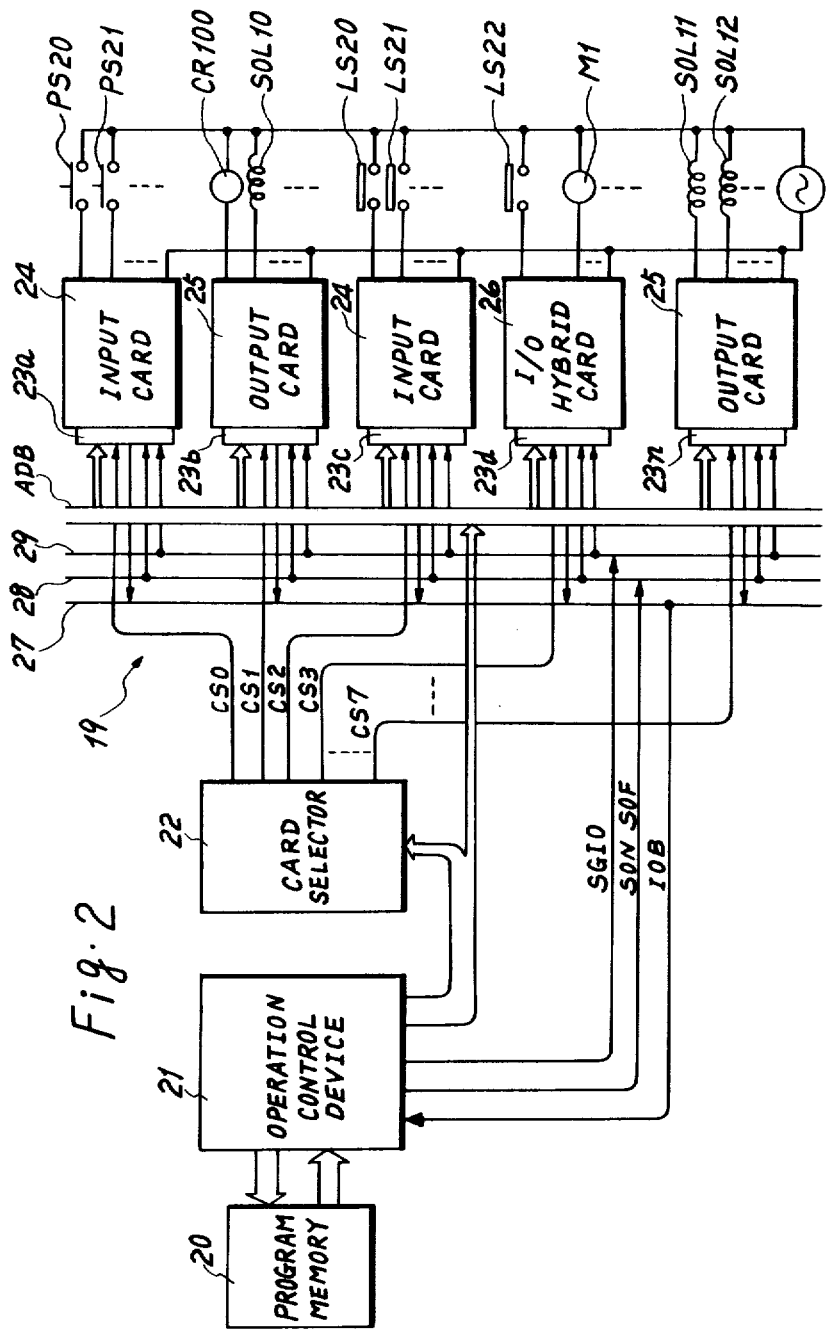
FIG. 2 is a rough block diagram of a sequence controller according to the present invention.

Referring now to FIG. 2, there is illustrated a constructional outline of a sequence controller according to the present invention, which comprises a program memory 20, an operation control device 21, a card selector 22 and an input/output (I/O) section generally indicated at 19.

The I/O section 19 comprises a plurality of connectors 23a–23n, to which connected in random order are input cards 24, output cards 25 and at least one input/output hybrid card 26, which constitute input circuits, output circuits and an input/output hybrid circuit, respectively. Each of the input cards 24 is connected to input elements such as, for example, push button switches PS20 and PS21 and limit switches LS20 and LS21, whose closed and open states are detected by the input card 24 for conversion into ON-OFF information IOB (e.g. logical values "1" and "0"). Each of the output cards 25 is connected to output elements such as a relay CR100 and solenoids SOL10–SOL12 and is arranged to energize or deenergize a designated one of the output elements upon receipt of an ON or OFF command signal SON or SOF output from the operation control device 21. The input/output hybrid card 26 is connected to a limit switch LS22 for position confirmation and a main relay M1 for control of, for example, a feed motor. As will be described in greater detail, the card 26 is arranged to directly deenergize the main relay M1 in response to the state change of the limit switch LS22 before receiving from the operation control device 21 an OFF command signal SOF directed to the main relay M1.

The connectors 23a–23n are connected to an I/O address bus line ADB and signal lines 27, 28 and 29 in parallel relation with one another and therethrough, further to the operation control device 21. The connectors 23a–23n are also connected to the card selector 22 so as to respectively receive card selection signals CS0–CS7 therefrom. As will be described in more detail, the card selector 22 applies one of the card selection signals CS0–CS7 to the corresponding one of the connectors 23a–23n when receiving from the operation control device 21 most significant bit data of card address data, for example, a most significant 8-bit signal in the case where the address data is composed of an 11-bit signal, so that a selection is made of any one of the input cards 24, the output cards 25 and the hybrid card 26 which is in connection with the designated one of the connectors 23a–23n.

Figure 7:
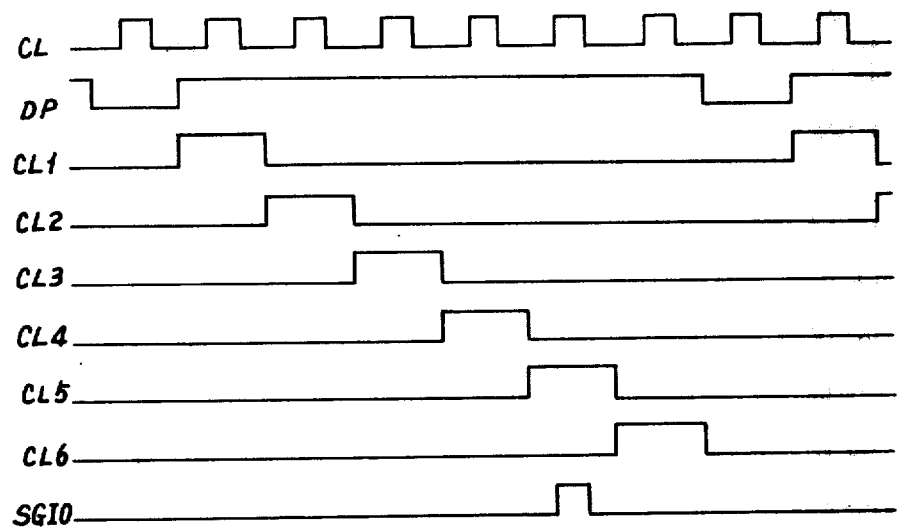
FIG. 7 is a time-chart of control signal clocks.
Figure 3:
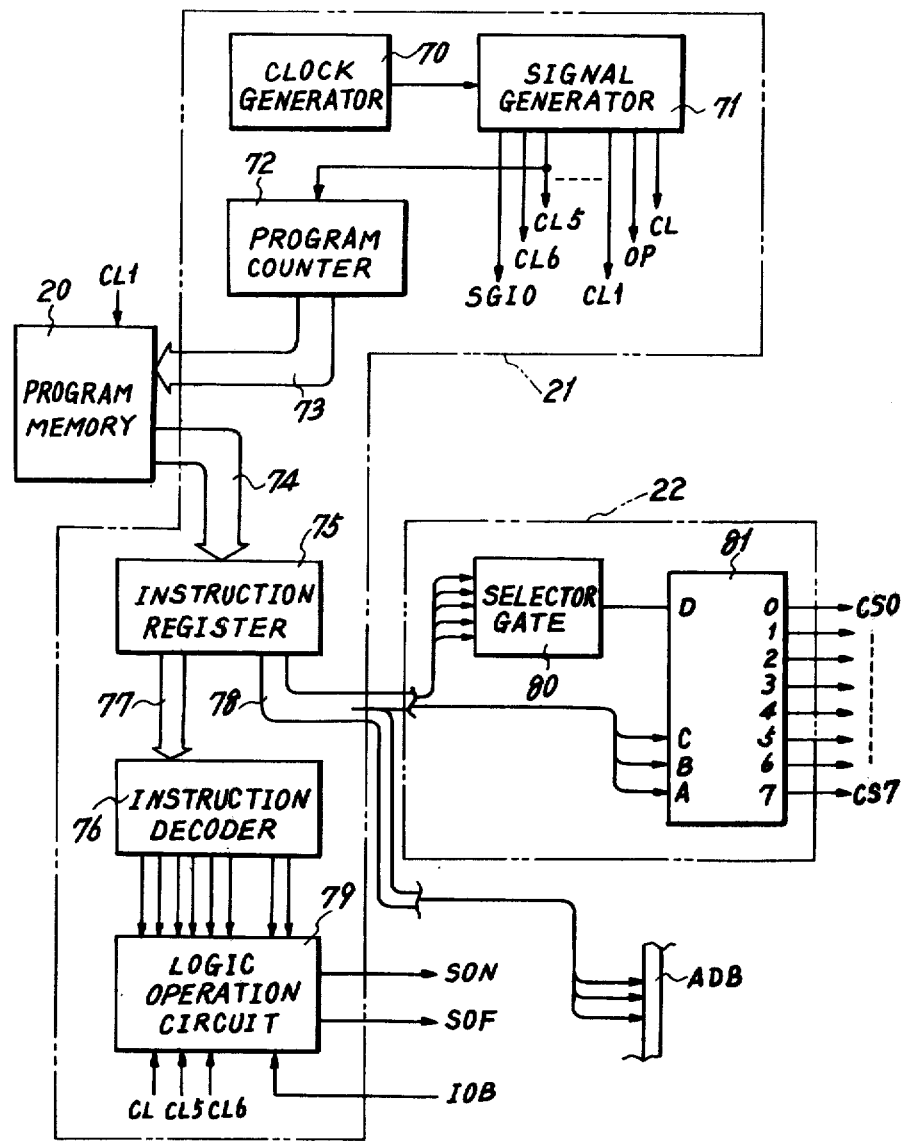
FIG. 3 is a detailed block diagram of an operation control device shown in FIG. 2.

Referring now to FIG. 3, the detail of the operation control device 21 is as shown comprising a clock generator 70, which is connected to a signal generator 71 so as to supply thereto a train of clock pulses. The signal generator 71 is arranged in a suitable manner to produce from the clock pulses various timing clocks CL, OP, CL1=CL6 and SGIO with a timing allocation as illustrated in FIG. 7. A program counter 72 is connected to the signal generator 71 and increments its content each time it receives a fifth timing clock CL5 from the signal generator 71. The counter 72 is also connected to the memory 20 through a memory address bus 73 so as to supply thereto 12-bit address data for designation of memory addresses. The memory 20 is capable of storing a sequence program composed of a series of program instructions, each of which is in turn composed of an operation command and address data. By way of example, the memory 20 may be a read-only memory, whose each address contains 16 bits of data, and thus, a memory data bus 74 for 16-bit data is used to connect the output terminals of the memory 20 to an instruction register 75. Further, the memory 20, when receiving the address data, reads out one of the program instructions, designated thereby, for storage in the instruction register 75. By its own nature, the program counter 72 is restored to its initial counting state, namely to a state having its content cleared, after attaining its maximum counting value, so that the reading-out of the program instructions to the register 75 is cyclically executed.

The function of the instruction register 75 is to temporarily store any read-out instruction until a successive instruction is supplied thereto. The register 75 is connected to an instruction decoder 76 through a command bus 77 suitable for transmission of 5-bit command data to the decoder 76. The decoder 76 decodes the command data into any one of a number of test commands and output commands, referred to later, which are received by a logic operation circuit 76. As easily understood, these commands are distinguished from one another depending upon different combinations between signals (e.g. "1" or "0" in logical representation) which appear on lines of the command bus 77, respectively, and are output from the decoder 76 only one at a time. When the decoder 76 decodes a specified command data combination, one of the output terminals of the decoder 76 corresponding thereto goes high, so that the one of the commands is input to the logic operation circuit 79.

The logic operation circuit 79 is connected to the above-noted signal line 27 so as to receive therefrom the ON-OFF information IOB representing the logical status of any selected input or output element. The circuit 79 is also connected to the above-noted two signal lines 28 (shown as one in FIG. 2) so as to supply respectively thereto the ON and OFF command signals SON, SOF to energize or deenergize any selected output element. The function of the circuit 79 is to test whether any selected input or output element is in the ON state or in the OFF state by reading the information IOB when one of the test commands is applied thereto, to store each of the test results in a register (flip-flop), not shown, provided therein and to output the output command signal SON or SOF to any selected output element based upon the test result when one of the output commands is applied thereto. The circuit 79 is more fully described in U.S. Pat. No. 4,048,622 to one of Applicants of this application and therefore, further description with respect thereto will be omitted for the sake of brevity.

Still in FIG. 3, the instruction register 75 is connected at its output terminal with an address data bus 78, which is separated into two bundles of data lines: one for transmitting 8-bit card address data to the card selector 22 and the other for transmitting 3-bit I/O address data to the I/O address bus ADB. The selector 22 comprises a gate circuit 80 and a card selection decoder 81. The gate circuit 80 is connected to receive 5-bit data of the card address data from the register 75 and, when the 5-bit data represents a specified signal status, for example, 00000, applies a logical low signal to a D-terminal of the decoder 81 so as to thereby enable the same to operate. The decoder 81 is connected to receive other 3-bit data of the card address data from the register 75 and, when enabled to operate, outputs one of the card selection signals CS0–CS7 in accordance with a logical status of the 3-bit data applied to data input terminals A-C thereof. The card selection signals CS0–CS7 are used for selection of the above-noted input cards 24, output cards 25 and I/O hybrid card 26 which are under the control of the card selector 22. And, the 3-bit I/O address data is used for selection of the input elements, the output elements or the input and output elements connected to any selected card. While in this particular embodiment, only the card selector 22 is illustrated in order to simplify the representation, it will be realized that the maximum number of said selectors 22 which may be provided is at most thirty-three, because the 5-bit selector data is used herein. In this case, the gate circuits of those selectors are arranged to open their gates in response to a particular digital representation of the 5-bit data. For example, the gate circuits of the first to third card selectors are arranged to open their gates respectively when the 5-bit data represents 00000, 00001 and 00010.

Figure 4:
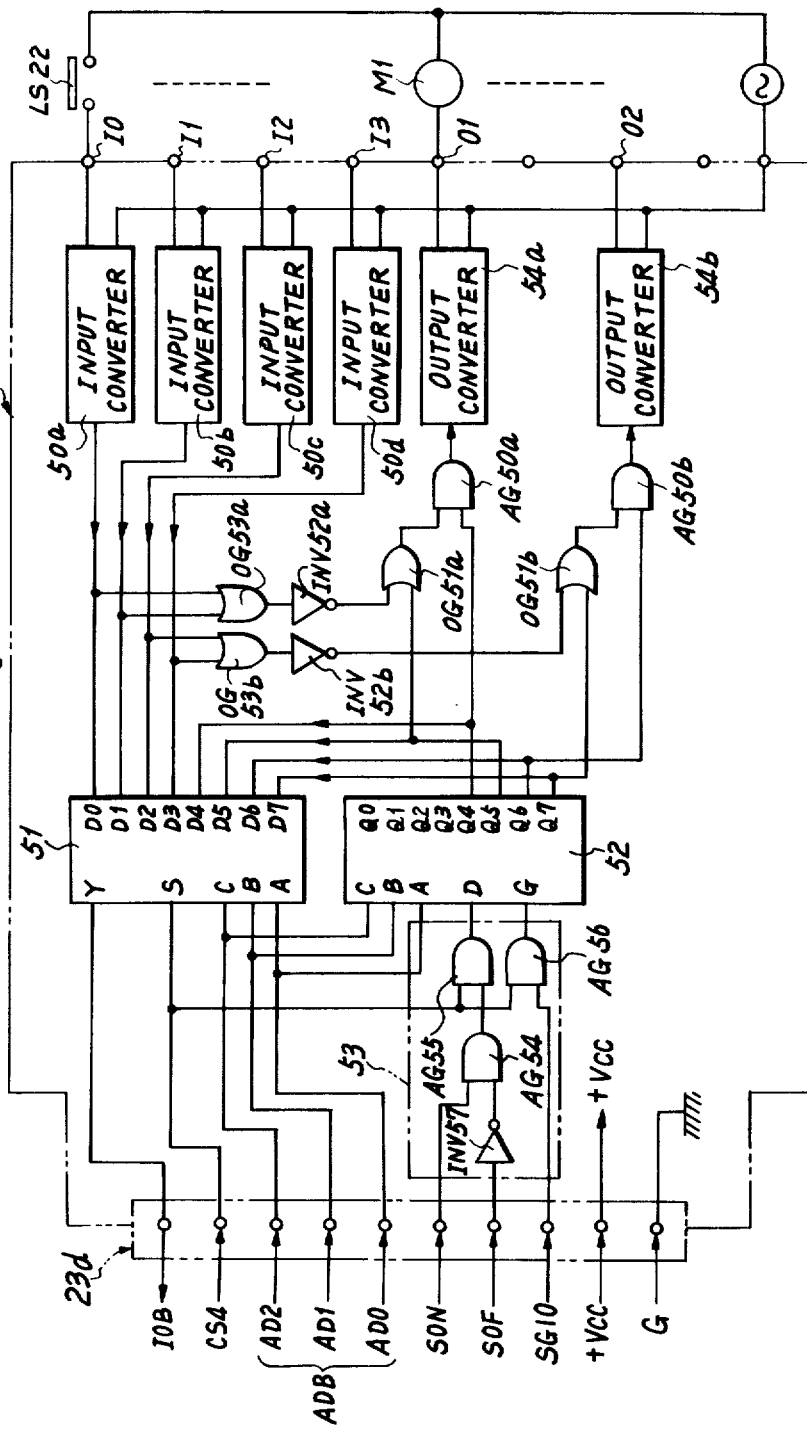
FIG. 4 is a detailed block diagram of an input/output hybrid card shown in FIG. 2.

FIG. 4 shows the detail of the I/O hybrid card 26 characterizing the present invention. The card 26 is composed of input converting circuits 50a–50d, a data selector or multiplexer 51, an addressable latch circuit 52, a gate circuit 53, output converting circuits 54a and 54b, AND gates AG50a and AG50b, OR gates OG51a, OG51b, OG53a and OG53b, and inverters INV52a and INV52b. The input elements such as the limit switch 22 are connected respectively to input terminals 10–13 and, when closed, apply an AC voltage to the associated input converting circuits 50a–50d. The circuits 50a–50d step down the ON-OFF information from an AC power level to a so-called "TTL" level and output the information to input terminals D0–D3 of the multiplexer 51 connected thereto, respectively. The multiplexer 51 is connected at its address terminals A, B and C to the I/O address bus ADB so as to be informed of the I/O address data from the instruction register 75. The multiplexer 51 is enabled to operate upon receipt, at its terminal S, of the card selection signal CS4 which is supplied from the decoder 81. The multiplexer 51, when so enabled, selects one of the ON-OFF information, being applied to the data input terminals D0–D7 thereof, in accordance with the I/O address data and supplies the selected ON-OFF information from its data output terminal Y back to the logic operation circuit 79 through the connector 23d and the signal line 27.

The gate circuit 53 comprises AND gates AG54–AG56 and an inverter INV57. The AND gate AG54 is opened when receiving the ON command signal SON and is closed when receiving the OFF command signal SOF through the inverter INV57. The AND gate AG 55 are connected to receive the output of the AND gate AG 54 and the card selection signal CS4. Thus, the gate AG55, when opened, supplies the ON command signal SON to an input terminal D of the latch circuit 52 and, when closed, the OFF command signal SOF to the terminal D. The AND gate AG56 is opened upon receipt of the selection signal CS4 and the above-noted control signal SGIO (FIG. 7) so as to apply an enabling signal to an input terminal G of the latch circuit 52. This circuit 52 incorporates therein eight memory elements, which are associated respectively with storage addresses Q0–Q7 thereof. The circuit 52, when enabled to operate, selects one of the memory elements in accordance with the 3-bit I/O address data applied to input terminals A-C thereof and writes in the selected one of the memory elements the ON or OFF command signals, arriving at the input terminal D, for storage therein. The memory elements output logical high signal "H" from the corresponding storage addresses Q0–Q7 while they store therein the ON command signals SON, respectively.

The output converting circuits 54a and 54b energize the output elements, connected to output terminals 01 and 02, upon receipt of the high signals "H" applied from the storage addresses Q4 and Q6 of the latch circuit 52. Each of the converting circuits 54a, 54b is used to step up the signal SON from the "TTL" level to the AC power lever and is composed of a conventional AC switch such as a so-called "TRIAC" (triode AC semiconductor switch).

The storage addresses Q4–Q7 of the latch circuit 52 are connected respectively to the input terminals D4–D7 of the multiplexer 51. Of the storage addresses Q4–Q7, the addresses Q4 and Q6 are connected also to one input terminal of the AND gates AG50a and AG50b, each acting as a passage inhibiting circuit, and the addresses Q5 and Q7 are connected also to one input terminal of the OR gates OG51a and OG51b, each acting as an invalidation removing circuit, respectively. The OR gate OG51a is connected at the other input terminal thereof to the output terminals of the input converting circuits 50a, 50b through the inverter INV-52a and the OR gate OG53a. The other input terminal of the OR gate OG51b is connected to the output terminals of the input converting circuits 50c, 50d through the invertor INV52b and the OR gate OG53b. Further, the OR gates OG51a, OG51b are connected at their output terminals to the other input terminals of the AND gates AG50a and AG50b, whose output terminals are in turn connected to the input terminals of the output converting circuits 54a and 54b, respectively.

Accordingly, the AND gate AG 50a is opened while the ON command signal SON is stored in the latch memory element associated with the storage address Q4 and while both of the input converting circuits 50a, 50b continue outputing logical low signals "L" because no voltage is applied to the input terminals 10, 11. The opening of the AND gate AG50a is otherwise effected while the ON command signal SON is stored in both of the latch memory elements associated respectively with the storage addresses Q4 and Q5. In either event, the high signal "H" appearing at the address Q4 is applied through the AND gate AG50a to the output converting circuit 54a, which thus energizes the output element connected thereto. Also, the AND gate AG50b supplies the ON command signal SON from the storage address Q6 to the output converting circuit 54b while the outputs of the input converting circuits 50c, 50d are both in the logical low level, or while the storage address Q7 also outputs the ON command signal SON.

Figure 5:
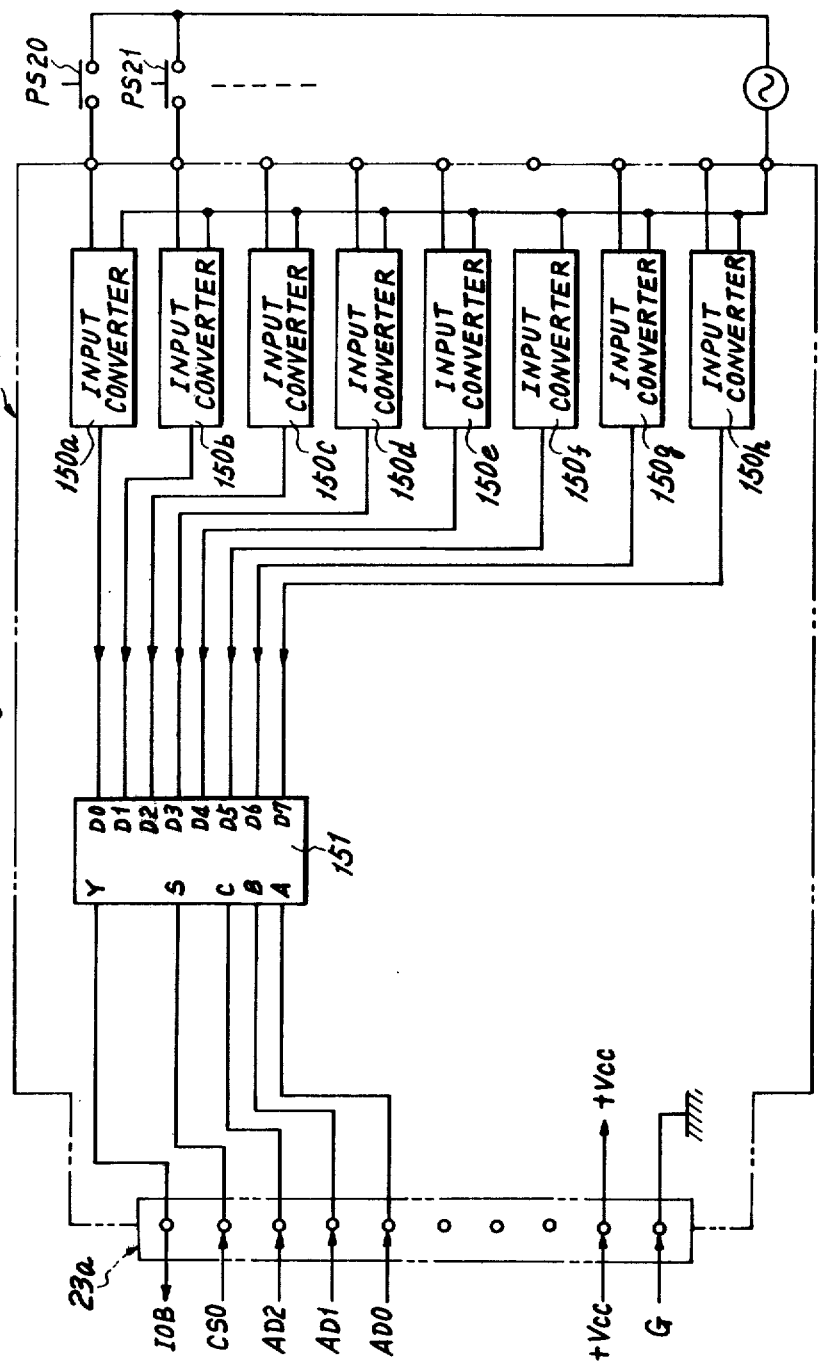
FIG. 5 is a detailed block diagram of an input card shown in FIG. 2.
Figure 6:
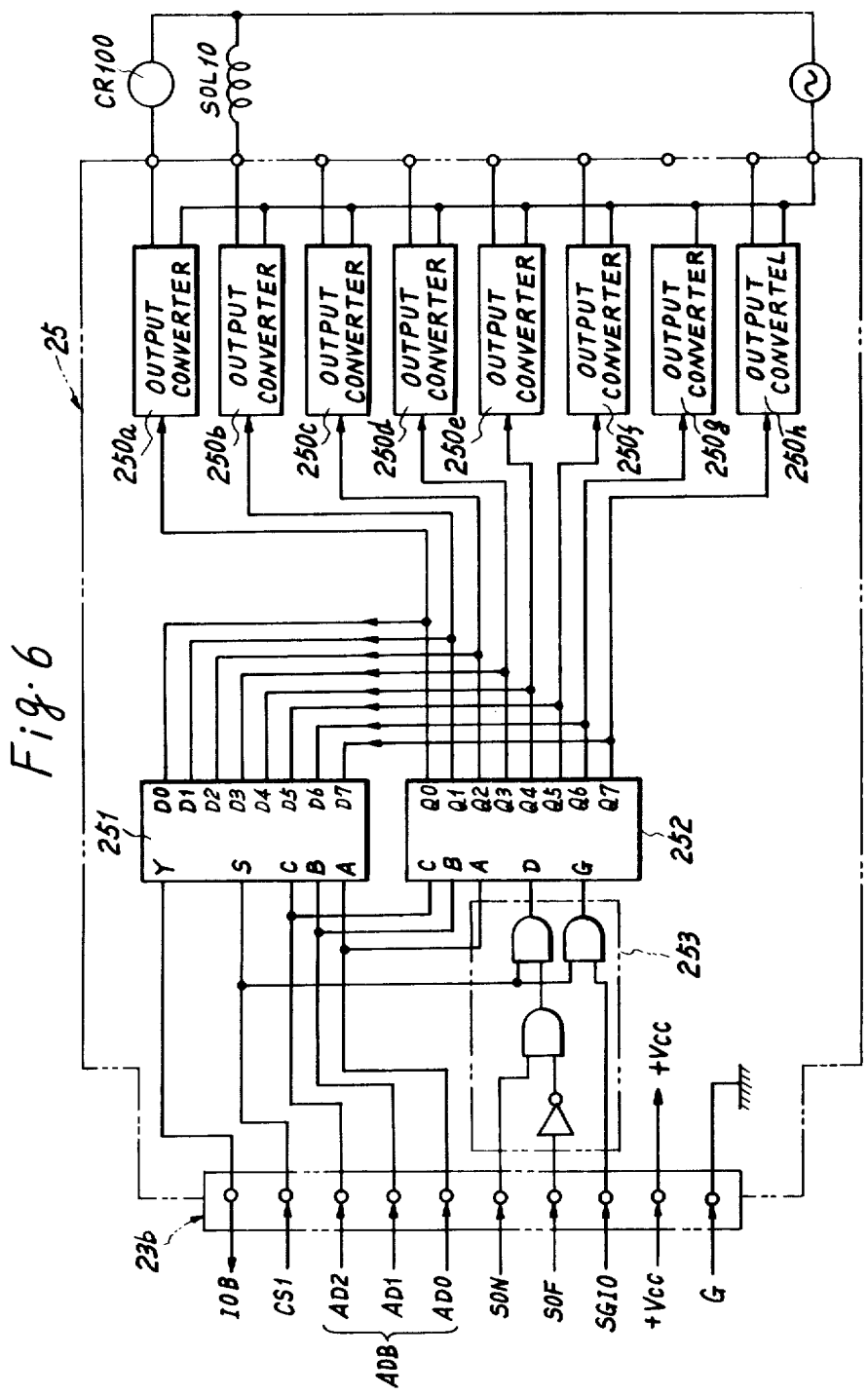
FIG. 6 is a detailed block diagram of an output card shown in FIG. 2.

FIG. 5 illustrates details of the input card 24, which comprises a multiplexer 151 and a plurality of input converting circuits 150a–150h. The functions of the multiplexer 151 and each of the circuits 150a–150h correspond respectively to those of the multiplexer 51 and each of the input converting circuits 50a–50d shown in FIG. 4. Further, FIG. 6 illustrates the detail of the output circuit 25, which comprises a multiplexer 251, an addressable latch circuit 252, a gate circuit 253 and a plurality of output converting circuits 250a–250h. As readily understood, the multiplexer 251, the latch circuit 252, the gate circuit 253 and each of the converting circuits 250a–250h perform the same functions as those which are designated by reference numerals 51, 52, 53 and 50a in FIG. 4, respectively.

Figure 8:
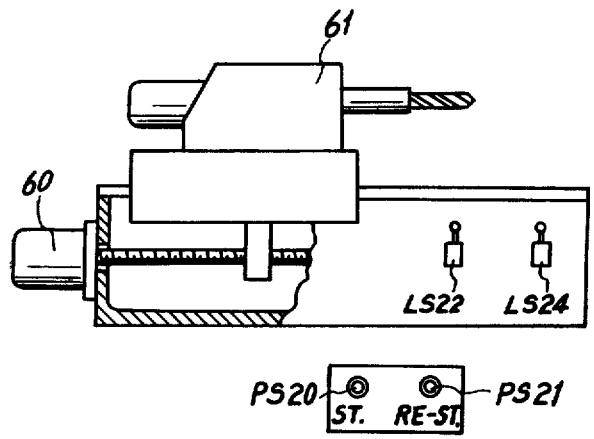
FIG. 8 is an external view illustrative of one example of machine tools controlled by the sequence controller according to the present invention.
Figure 9:
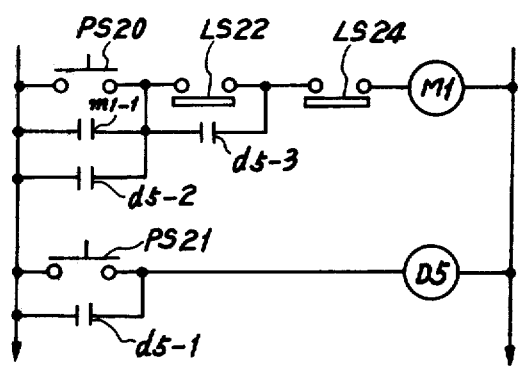
FIG. 9 is a ladder diagram of an electric relay circuit used for controlling the machine tool shown in FIG. 8.

The operation of the sequence controller and, particularly, the I/O hybrid card 26 as constructed above will be described hereinafter. Referring now to FIG. 8, a conventional spindle unit is illustrated as one example of preferred objects that the sequence controller according to the present invention controls. For the purpose of explanation, it is now assumed that when a start button switch PS20 is depressed, the energization of a motor 60 is effected to advance a spindle head 61 to an intermediate position where a limit switch LS22 is actuated, and that when a restart push button switch PS21 is depressed subsequently, the spindle head 61 is readvanced until it actuates another limit switch LS24. Illustrated in FIG. 9 is a ladder diagram of a sequence control circuit therefor, based upon which a sequence program as shown in TABLE 1 is prepared to be stored in the memory 20. In FIG. 9, M1 denotes a main relay for energizing or deenergizing the motor 60, m1-1 denotes a contact of the main relay M1, D5 denotes an auxiliary relay, and d5-1, d5-2 and d5-3 respectively denote contacts of the auxiliary relay D5.

In order for the sequence controller to carry out such operation control, the switches PS20, PS21, LS22 and LS24 and the relay M1 which correspond respectively to those designated by the same reference numerals in FIG. 9 are connected to the cards 24 and 26 as fully described hereinbefore. In this particular embodiment, as best shown in FIG. 4, the limit switch LS22 and the main relay M1 are connected to the I/O hybrid card 26 because they are important in exactly positioning the spindle head 61 at the intermediate position. The auxiliary relay D5 shown in FIG. 9 is not used, however, and the memory element (hereinafter called "memory element D5") which is provided in the latch circuit 52 in correspondence to the storage address Q5 is substituted therefore. Namely, the memory element D5, i.e., Q5 is intended to perform the function of the auxiliary relay D5.

TABLE 1

| Memory Address | Instruction | Meaning |
|---|---|---|
| 1000 | TNO PS20 | Test whether start switch PS20 is in ON state. |
| 1001 | TNO M1 | Test whether main relay M1 is in On state so as to have ORed result with previous test result. |
| 1002 | TNE D5 | Test whether memory element D5 is in ON State so as to have ORed result with previous test result. |
| 1003 | TFO LS22 | Test whether limit switch LS22 is in OFF state. |
| 1004 | TNE D5 | Test whether memory element D5 is in ON state so as to have ORed result with previous test result. |
| 1005 | TFA LS24 | Test whether limit switch LS24 is in OFF state so as to have ANDed result with previous test result. |
| 1006 | YON M1 | Energize main relay M1 if last test result is satisfied or deenergize it if last test result is unsatisfied. |
| 1007 | TNO PS21 | Test whether re-start switch PS21 is in ON state. |
| 1008 | TNE D5 | Test whether memory element D5 is in ON state so as to have ORed result with previous test result. |
| 1009 | YON D5 | Energize memory element D5 if last test result is satisfied. |

After the sequence program as shown on TABLE 1 is written by a program write-in device, not shown, into the memory 20, the operation of the sequence controller is initiated so as to successively read out the program instructions being stored in the memory 20. During such operation, the content of the program counter 72 is incremented each time the fifth timing clock CL5 is applied thereto. When receiving the first timing clock CL1 after the increase of the counter content to "1000", the memory 20 is enabled to read out a program instruction TNO PS20 from address 1000 for storage in the register 75 at the subsequent issuance of the third timing clock CL3. The coded test command TNO of the read-out instruction is applied to the decoder 76, which thus inputs a test command signal TNO to the logic operation circuit 79. On the other hand, the coded address information PS20 of the read-out instruction is separated into card address data and I/O address data, which are then input respectively to the card selector 22 and the I/O address bus ADB. Assuming now that the start button switch PS20 is at zero address, the gate circuit 80 is opened when receiving address data "00000" in the form of binary code, so as to enable the selector decoder 81 to operate. The decoder 81, when so enabled, outputs the selection signal CS0 from its output terminal 0 in accordance with address data "000" which is applied to its data input terminals A-C also in the form of binary code. The I/O address data represented by "000" in binary code is supplied from the bus ADB to all of the cards 24, 25 and 26 through the connectors 23a-23n for use as address input data to the multiplexers 51, 151 and 251. Accordingly, the multiplexer 151 of the input card 24 is enabled by the selection signal CS0 to select the start button switch PS20 designated by the address data, whereby the ON or OFF state of the switch PS20 is applied back to the logic operation circuit 79 through the connector 23a and the signal line 27.

The subsequent issuance of the fifth timing clock CL5 causes the program counter 72 to increase to a 1001-decimal number and also causes the logic operation circuit 79 to execute a test in accordance with the test command TNO. Namely, the circuit 79, upon receipt of the timing clock CL5, test whether the push button switch PS20 has been in ON state, by reference to the ON-OFF information IOB of the switch PS20 supplied thereto. Since the test command TNO is intended to cause the selected ON-OFF information to be subsequently ORed with the result of a successive test, the result of the present test is stored in an OR test register, not shown, provided in the operation circuit 79.

After the issuance of the sixth timing clock CL6, the first timing clock CL1 is again issued to enable the memory 20 to read out a successive program instruction TNO M1 from address "1001", and a test is made with the ON-OFF information of the main relay M1 connected to the I/O hybrid card 26. In more detail, address data "0000" and "100" in binary code are applied respectively to the gate circuit 80 and the selector decoder 81, which thus outputs the signal CS4 for selection of the card 26. Also, address data "100" in binary code is applied to the card 26, whose multiplexer 51 sends back to the logic operation circuit 79 the signal appearing on the storage address Q4 of the latch circuit 52. The logic operation circuit 79 executes a test of whether the logical high signal "H" has appeared on the latch storage address Q4, and makes the test result ORed with the previous test result for storage in the OR test register.

In response to the fifth timing clock CL5 which is issued after the reading out of a further successive instruction TNE D5 from the memory 20, the operation circuit 79 tests whether the latch memory element D5 has been set, and makes this test result ORed with the last test result for storage in the OR test register. The test command TNE represents the final test of a certain group of OR tests relating to, for example, the switch PS20 and the contacts m1-1 and d5-2 shown in FIG. 9. In this connection, the logic operation circuit 79, when receiving the sixth timing clock CL6, logically transfers the final result of the certain group of the OR tests from the OR test register to an AND test register, not shown, provided in the circuit 79 and resets the OR test register for use in a successive group of OR test relating to, for example, the limit switch LS22 and the contact d5-3 shown in FIG. 9.

Thereafter, tests are executed to check the ON-OFF information of the limit switch LS22, the latch memory element D5 and the limit switch LS24 in the same manner as described above. When an output instruction YON M1 is read out from address 1006 of the memory 20, the main relay M1 is energized or deenergized depending upon the final test result which has been stored in the AND test register after the execution of the test instructions stored in the memory addresses 1000 to 1005. The subsequent reading-out of test instructions TNO PS21 and TNE D5 from the memory addresses 1007 and 1008 effects checking the ON-OFF information of the restart push button PS21 and the set state of the latch memory element D5, respectively, and further reading-out of an output instruction YON D5 from the memory address 1009 causes the latch memory element D5 to be energized or deenergized depending upon a final result which has been stored after the execution of the test instructions TNO PS21 and TNE D5. In this manner, the sequence program is executed step by step in accordance with the program instructions read out from the memory 20, so that the sequence controller is able to achieve the same control function as the hard-wired circuit shown in FIG. 9.

Consider now that the start button switch PS20 is depressed when the spindle head 61 is at its original position as shown in FIG. 8. Since both of the limit switches LS22 and LS24 are open conditions, the final result of the tests which are executed in accordance with the test instructions stored at the memory addresses 1000 to 10005 indicates "satisfaction", and the output instruction YON M1 is then executed. As a result, an ON command signal SON is written in the memory element of the latch circuit 52 corresponding to the storage address Q4, which thus outputs the logical high signal "H". On the other hand, since the limit switch LS22 is in open state, the logical low signals "L" output from the input converting circuits 50a, 50b are applied through the OR gate OG53a to the invertor INV52a, which thus applies the logical high signal "H" to the OR gate OG51a.

Consequently, the AND gate AG50a is opened to apply the high signal "H" from the storage address Q4 to the output converting circuit 54a. The main relay M1 is energized to rotate the motor 60, whereby the spindle head 61 is advanced. After the departure of the spindle head 61 from the original position, the start button switch PS20 may be relieved of depression. It is however possible to keep the main relay M1 energized since the high signal "H", representing the energization of the main relay M1, is selected by the multiplexer 51, from which the signal "H" is sent as the ON-OFF information IOB back to the logic operation circuit 79 through the signal line 27 for use in the execution of the test instruction TNO M1.

When the spindle head 61 is advanced to the intermediate position, the limit switch LS22 is closed. Thus, the output from the input converting circuit 50a changes to the high signal "H", and the low signal "L" is output from the inverter INV52a. At this time, unless the restart button switch PS21 has not been depressed yet, the memory element D5 of the latch circuit 52 is in the reset state, and the low signal "L" appears on the latch storage address Q5. Namely, the closing of the limit switch LS22 results in changing the output of the OR gate OG51a to the low level "L" so as to immediately make the AND gate AG50a nonconductive.

Consequently, the main relay M1 is deenergized although the latch memory element corresponding to the storage address Q4 is not rewritten in accordance with an OFF command signal SOF. At the time of the actuation of the limit switch LS22, therefore, the motor 60 is deenergized independently of any program instruction that the sequence controller is executing at such time. The time delay from the actuation of the switch LS22 to the deenergization of the motor 60 depends upon the response speeds of the circuits 50a and 54a, the gates OG53a, OG51a and AG50a and the inverter INV52a and therefore, is constant. It will be realized, accordingly, that the spindle head 61 can be accurately positioned at the intermediate position without having a dispersion of stop positions thereof in repeat operation cycles.

Figure 1:
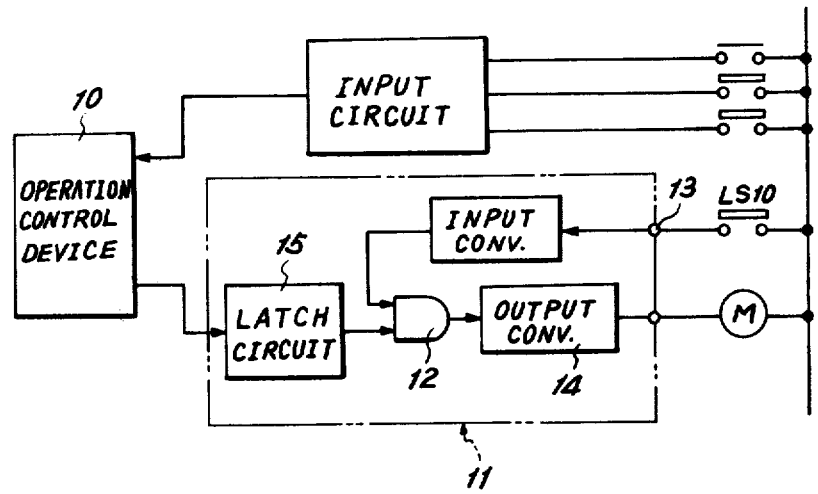
FIG. 1 is a block diagram of a prior sequence controller, particularly showing an output circuit thereof incorporating an inhibition gate.

Thereafter, by the execution of the test instruction TFO LS22 stored at the memory address 10003, it is confirmed that the limit switch LS22 has already been energized, and by the execution of the test instruction TNE D5 stored at the memory address 1004, it is also confirmed that the memory element D5 of the latch circuit 52 has not been energized yet. The result of these tests represents "unsatisfaction", which is stored in the AND test register of the logic operation circuit 79. In this connection, the execution of the output instruction YON M1 read out from the memory address 1006 results in writing the OFF command signal SOF in the latch memory element corresponding to the latch storage address Q4, whereby the main relay M1 is deenergized in accordance with the sequence program. Accordingly, the ON command signal SON for the relay M1 is left stored in the latch circuit 52 without being rewritten to the OFF command signal SOF, whereas the controller of the prior art (FIG. 1) is arranged only for the purpose of invalidating the signal from the latch circuit 15 by the signal produced by the input element LS10. In addition, the operational state of the latch memory element corresponding to the storage address Q4 is controlled to coincide with that of the relay M1 in a short period of time. It is also noted that the sequence controller according to the present invention does not need any additional external cable which may be used in the prior controller for reading the operational state of the output element, that is the relay M.

When the re-start button switch PS21 is depressed, the condition to set the latch memory element D5 is satisfied, and the output instruction YON D5 read out from the memory address 1009 is executed to set the latch memory element D5. The logical high signal "H" appearing on the latch storage address Q5 is output through the OR gate OG51a to the AND gate AG50a, which is thus caused to be ready for opening. The latch memory element D5, having already been set, satisfies the condition to energize the main relay M1. When in the next scan cycle, the output instruction YON M1 stored in the memory address 1006 is executed, the latch memory element corresponding to the latch storage address Q4 is again energized to output the high signal "H" from the storage address Q4. Accordingly, the signal "H" is applied to the output converting circuit 54a through the AND gate AG50a, thus energizing the relay M1 so that the spindle head 61 is re-advanced. When the spindle head 61 reaches the advanced position, the limit switch LS24 is actuated. The condition to energize the relay M1 is thus unsatisfied, and the deenergization of the relay M1 is effected to stop feeding the spindle head 61.

Although in the above-described embodiment, the signals "H" from the two input converting circuits are ORed with each other to be applied to the invertor INV52a or INV53b, the reason therefore is that it is practical in positioning to use two limit switches: one for position detection and the other for security against failure of the position detection switch. It is realized, however, that as the case may be, only the signal from the output converting circuit connected to the position detection limit switch is supplied directly to the invertor INV52a or INV52b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A programmable sequence controller comprising:
   memory means for storing a sequence of control instructions, each of said instructions including an operation command and address data associated with said operation command, wherein said operation commands include test commands or output commands;
   read-out control means for controlling said memory means so as to successively read out each control instruction in said sequence of control instructions therefrom;
   at least one input converter connectable to an external input element for converting an operational state thereof into a logical value;
   a data selector connected to said input converter and responsive to said address data for selecting said logical value of said input element when the input element is designated by said address data;
   logic operation means responsive to a said test command for testing said selected logical value supplied from said data selector and thereafter responsive to a said output command for generating an output command signal based upon the result of the test;
   an addressable output memory having at least two storage locations and adapted to store said output command signal at each of said two storage locations as designated by said address data associated with said output command;
   gate means connected to said input converter and said two storage locations for inhibiting passage of said output command signal from one of said two storage locations when receiving said logical value of said input element and for enabling passage of said output command signal from the one of said two storage locations when receiving said output command signal from the other of said two storage locations; and
   at least one output converter connectable to an external output element and connected to said gate means for energizing said output element based upon said output command signal supplied therefrom.

2. A programmable sequence controller as set forth in claim 1, wherein:
   said input converter, said data selector, said addressable output memory, said gate means and said output converter are provided on a circuit board so as to constitute as input/output hybrid card.

3. A programmable sequence controller as set forth in claim 2, wherein:

said data selector is also connected to said two storage locations of said addressable output memory for selecting said output command signal stored at each of said two locations when said data selector receives said address data designating said each of two storage locations.

4. A programmable sequence controller as set forth in claim 2, wherein said gate means comprises:

first signal outputting means connected to said input converter and said other of said two storage locations for outputting a gate signal when not receiving said logical value from said input converter and when receiving said output command signal from said other of said two storage locations; and second signal outputting means connected to said first signal outputting means, said one of said two storage locations and said output converter for outputting said output command signal from said one of said two storage locations to said output converter when receiving said gate signal from said first signal generating means.

5. A programmable sequence controller as claimed in claim 4, wherein:

said first signal outputting means comprises an inverter connected to said input converter and an OR gate connected to the other of said two storage locations and said inverter; and said second signal outputting means is an AND gate responsive to said gate signal from said OR gate and said output command signal from said one of two storage locations.

* * * * *